United States Patent
Kim et al.

(10) Patent No.: US 9,001,493 B2
(45) Date of Patent: Apr. 7, 2015

(54) MULTILAYERED CERAMIC ELECTRONIC COMPONENT AND MANUFACTURING METHOD OF THE SAME

(71) Applicant: Samsung Electro-Mechanics Co., Ltd., Suwon-si, Gyunggi-do (KR)

(72) Inventors: Sung Woo Kim, Suwon-si (KR); Jae Yeol Choi, Suwon-si (KR); Yu Na Kim, Suwon-si (KR); Jong Ho Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 235 days.

(21) Appl. No.: 13/685,194

(22) Filed: Nov. 26, 2012

(65) Prior Publication Data

US 2014/0022690 A1   Jan. 23, 2014

(30) Foreign Application Priority Data

Jul. 19, 2012   (KR) .................... 10-2012-0078848

(51) Int. Cl.
| | |
|---|---|
| *H01G 4/06* | (2006.01) |
| *H01G 7/00* | (2006.01) |
| *H01G 4/30* | (2006.01) |
| *H01G 4/12* | (2006.01) |

(52) U.S. Cl.
CPC . *H01G 4/30* (2013.01); *H01G 4/12* (2013.01); *H01G 4/1227* (2013.01)

(58) Field of Classification Search
CPC ......... H01G 4/30; H01G 4/1227; H01G 4/12; H01G 2/00; H01G 2/20; H01G 4/005; H01G 4/008; H01G 4/01; H01G 4/1209; H01G 4/20; H01G 4/206; H01G 4/232; H01G 4/302; H01G 4/38
USPC .................... 361/311, 321.1, 321.2; 29/25.41
See application file for complete search history.

(56) References Cited

U.S. PATENT DOCUMENTS

| | | | |
|---|---|---|---|
| 6,780,494 B2 * | 8/2004 | Kobayashi et al. | ........... 428/210 |
| 2007/0230088 A1 * | 10/2007 | Fujimura et al. | ............... 361/311 |

FOREIGN PATENT DOCUMENTS

JP   2007-141991 A   6/2007

* cited by examiner

*Primary Examiner* — Dion R Ferguson
(74) *Attorney, Agent, or Firm* — McDermott Will & Emery LLP

(57) ABSTRACT

There is provided a multilayered ceramic electronic component including: a ceramic body in which a plurality of dielectric layers are stacked; a plurality of first and second internal electrodes formed on at least one of the dielectric layers and alternately exposed through both ends of the ceramic body in a stacking direction of the ceramic body; an a step compensation cover including a ceramic material having a viscosity higher than that of a ceramic material included in the ceramic body and formed on at least one of an upper surface and a lower surface of the ceramic body.

12 Claims, 4 Drawing Sheets

MULTILAYERED CERAMIC ELECTRONIC COMPONENT AND MANUFACTURING METHOD OF THE SAME

CROSS-REFERENCE TO RELATED APPLICATIONS

This application claims the priority of Korean Patent Application No. 10-2012-0078848 filed on Jul. 19, 2012, in the Korean Intellectual Property Office, the disclosure of which is incorporated herein by reference.

BACKGROUND OF THE INVENTION

1. Field of the Invention

The present invention relates to a multilayered ceramic electronic component and a manufacturing method of the same.

2. Description of the Related Art

As examples of electronic components using a ceramic material there may be provided a capacitor, an inductor, a piezoelectric element, a varistor, a thermistor, and the like.

Among these ceramic electronic components, a multilayered ceramic capacitor (MLCC) has a small size and high capacity, and is easily mounted.

The multilayered ceramic capacitor, a condenser having a chip shape, may be installed in circuit boards of various electronic products including a display device such as a liquid crystal display (LCD), a plasma display panel (PDP), or the like, a computer, a personal digital assistant (PDA), a cellular phone, and the like, to be charged with or discharge electricity.

Due to the recent trend for display devices to have a large size, a central processing unit (CPU) of the computer to be increased in speed, and the like, heat generation by an electronic device is intensified.

Therefore, it is necessary for stable capacitance at a high temperature and reliability to be secured in a multilayered ceramic capacitor so that an integrated circuit IC installed in the electronic device may be stably operated.

Since the multilayered ceramic capacitor is multilayered after an internal electrode having a predetermined thickness and an area smaller than that of the ceramic sheet is printed on the ceramic sheet, a step between a margin portion and a dielectric layer having the internal electrode formed thereon may be generated.

Accordingly, in a manufacturing process, while a plurality of ceramic sheets each having the internal electrode printed thereon are stacked and then pressed with uniform pressure, the margin portion having the step has a limitation in contraction, such that delaminations or cracks in which portions of multilayered dielectric layers are separated from each other may be generated due to the step.

Therefore, moisture, ions, a conductive foreign material, or the like, may be permeated into a surface of the multilayered ceramic capacitor where the internal electrode is exposed through the delaminations or cracks, resulting in insulation resistance deterioration in the multilayered ceramic electronic component, a degradation of reliability, and the like. In particular, the problems may be intensified in super capacitor products having a relatively large number of multilayered layers.

Related art document 1 discloses a multilayered ceramic capacitor, wherein outer layer ceramic green sheets are formed on an upper surface and a lower surface of a ceramic green sheet multilayered body having internal electrodes formed therein. However, it does not disclose that a viscosity of a material configuring the outer layer ceramic green sheets is higher than that of a material configuring a ceramic multilayered body.

RELATED ART DOCUMENT (Patent Document 1) Japanese Patent Laid-Open Publication No. JP 2007-141991

SUMMARY OF THE INVENTION

An aspect of the present invention provides a multilayered ceramic electronic component capable of compensating for a step in a ceramic body thereof to suppress a delamination or crack generation, such that penetration of moisture, ions, a conductive foreign material, or the like, into surfaces from which internal electrodes are exposed is significantly reduced.

According to an aspect of the present invention, there is provided a multilayered ceramic electronic component including: a ceramic body in which a plurality of dielectric layers are stacked; a plurality of first and second internal electrodes formed on at least one of the dielectric layers and alternately exposed through both ends of the ceramic body in a stacking direction of the ceramic body; and a step compensation cover including a ceramic material having a viscosity higher than that of a ceramic material included in the ceramic body and formed on at least one of an upper surface and a lower surface of the ceramic body.

The ceramic material included in the step compensation cover may have a viscosity of 10,000 to 1,000,000 cps.

The step compensation cover may be formed on a margin portion which is recessed in the ceramic body.

The step compensation cover may completely cover at least one of the upper surface and the lower surface of the ceramic body.

The multilayered ceramic electronic component may further include first and second external electrodes formed on both ends of the ceramic body and electrically connected to exposed portions of the first and second internal electrodes.

According to another aspect of the present invention, there is provided a manufacturing method of a multilayered ceramic electronic component, the method including: preparing a plurality of ceramic green sheets using a first ceramic slurry; forming first and second internal electrode patterns on at least one surface of each of the plurality of ceramic green sheets so as to be alternately exposed through both end surfaces thereof;
forming a laminate by stacking the plurality of ceramic green sheets having the first and second internal electrode patterns formed thereon; forming a step compensation cover on at least one of an upper surface and a lower surface of the laminate, using a second ceramic slurry having a viscosity higher than that of a first ceramic slurry; cutting the laminate having the step compensation cover formed thereon into individual chips; and forming a ceramic body by firing the cut individual chips.

In the forming of the step compensation cover, the second ceramic slurry may have a viscosity of 10,000 to 1,000,000 cps.

In the forming of the step compensation cover, the step compensation cover may be formed by applying the second ceramic slurry having a viscosity of 10,000 to 300,000 cps to at least one of the upper surface and the lower surface of the multilayered body.

In the forming of the step compensation cover, the step compensation cover may be formed by preparing a ceramic cover sheet using the second ceramic slurry having a viscosity of 300,001 to 1,000,000 cps, and high-temperature and high-pressure pressing the ceramic cover sheet on at least one of the upper surface and the lower surface of the laminate.

In the forming of the step compensation cover, the step compensation cover may be formed on a margin portion which is recessed in the ceramic body.

In the forming of the step compensation cover, the step compensation cover may completely cover at least one of the upper surface and the lower surface of the ceramic body.

The manufacturing method may further include forming first and second external electrodes on the both end surfaces of the ceramic body so as to cover s so as to cover exposed surfaces of the first and second internal electrode patterns.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
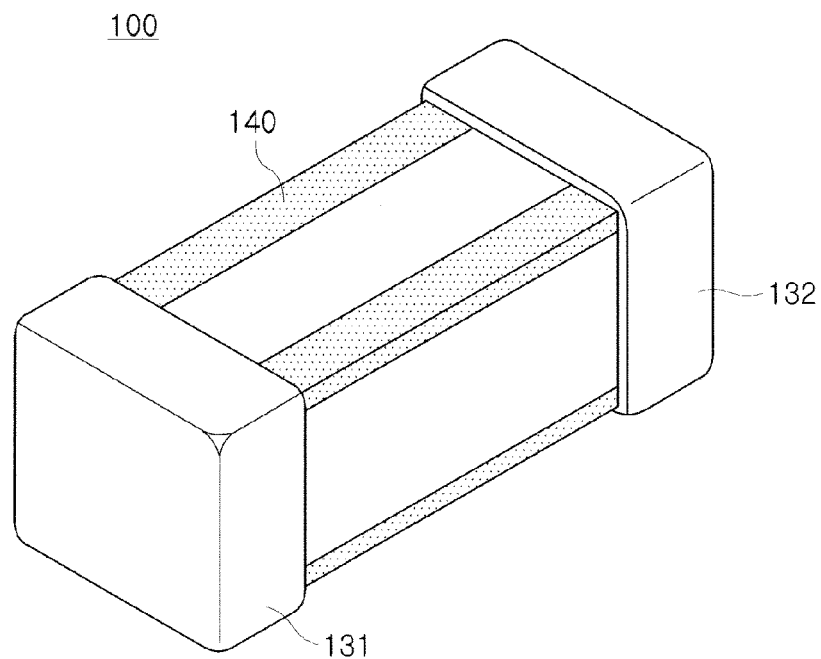
FIG. 1 is a perspective view illustrating a schematic structure of a multilayered ceramic capacitor according to an embodiment of the present invention.

Hereinafter, most preferred embodiments of the present invention will be described in detail with reference to the accompanying drawings so that those skilled in the art may easily implement the spirit of the present invention.

The invention may, however, be embodied in many different forms and should not be construed as being limited to the embodiments set forth herein.

Rather, these embodiments are provided so that this disclosure will be thorough and complete, and will fully convey the concept of the invention to those skilled in the art.

In the drawings, the shapes and dimensions may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention relates to a multilayered ceramic electronic component. An example of the multilayered ceramic electronic components according to an embodiment of the present invention includes a multilayered ceramic capacitor, an inductor, a piezoelectric element, a varistor, a chip resistor, a thermistor, and the like. Hereinafter, a multi-layered ceramic capacitor is described as an example of the multilayered ceramic electronic product.

In addition, for convenience of description, surfaces of a ceramic body on which external electrodes are formed are set as both ends, surfaces of the ceramic body which are vertically intersected with the both ends are set as both lateral surfaces, and surfaces of the ceramic body in a thickness direction are set as an upper surface and a lower surface.

Referring to FIGS. 1 through 4, a multilayered ceramic capacitor 100 according to the embodiment of the present invention may include: a ceramic body 110 in which a plurality of dielectric layers are stacked; first and second internal electrodes 121 and 122 each formed on one of the ceramic body 110 and alternately exposed through both ends of the ceramic body 110 in a vertical direction of the ceramic body 110; and step compensation covers 140 formed on at least one of an upper surface and a lower surface of the ceramic body 110.

Here, each of the step compensation covers 140 may be formed on one side edge portion, which is a margin portion in which the upper surface or the lower surface of the ceramic body 110 is excessively recessed.

In addition, first and second external electrodes 131 and 132 electrically connected to respective exposed surfaces of the first and second internal electrodes 121 and 122, may be formed on both ends of the ceramic body 110.

The step compensation cover 140 may compensate for a step between the margin portion and the dielectric layer of the ceramic body 110 to suppress a delamination or crack generation, thereby improving reliability of a product.

Figure 2:
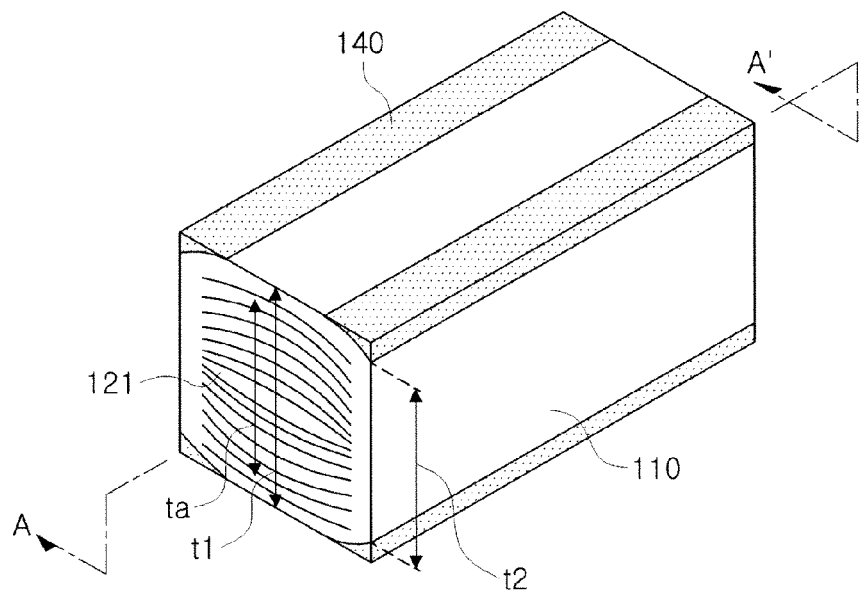
FIG. 2 is a perspective view schematically illustrating a ceramic body of FIG. 1, without external electrodes.
Figure 3:
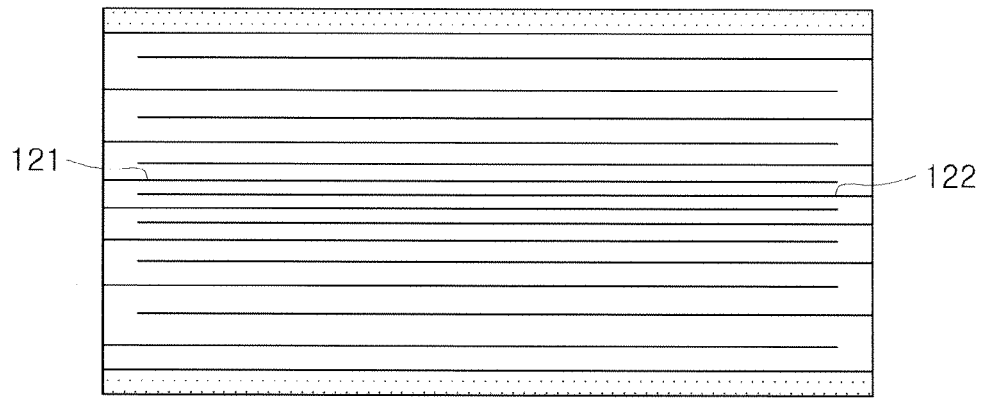
FIG. 3 is a cross-sectional view taken along line A-A' of FIG. 2.
Figure 4:
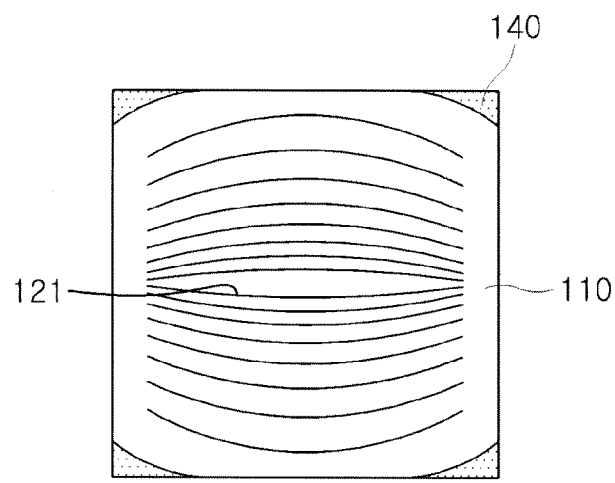
FIG. 4 is a side view of FIG. 2.
Figure 5:
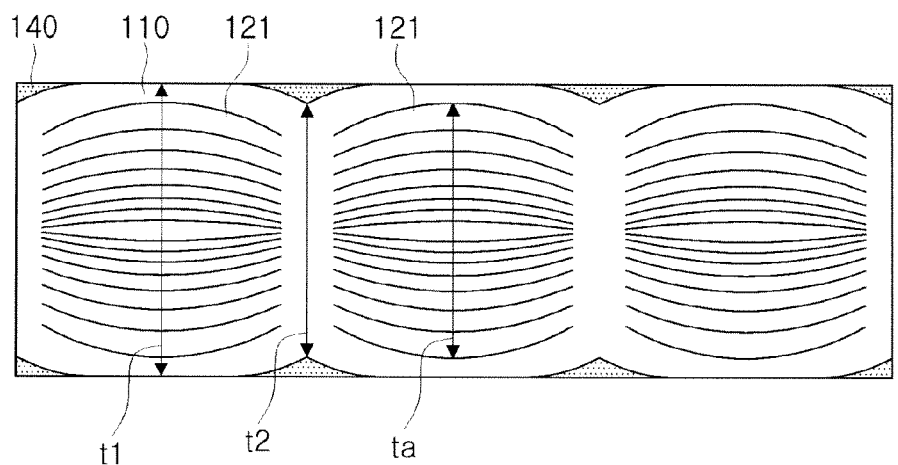
FIG. 5 is a side view illustrating a state in which a plurality of ceramic bodies are connected to each other in a vertical direction before being cutting into individual ceramic bodies as illustrated in FIG. 2.

Here, the step compensation cover 140 may be formed on the edge portion having the margin portion of the ceramic body 110 positioned therein so as to have a height of the step generated in the margin portion, equal to a size of the ceramic body 110 having a rectangular parallelepiped shape, that the height obtained by subtracting t2 from t1 shown in FIG. 2, such that the first and second external electrodes 131 and 132 may be easily coupled to the ceramic body 110.

The embodiment of the present invention illustrates the step compensation covers 140 formed on right and left edge portions of the ceramic body 110 are symmetrical to each other. However, the present invention is not limited thereto. In the case in which sizes of steps are different, the step compensation covers 140 formed on the right and left edge portions of the ceramic body 11 may be variously changed so as to correspond to the sizes of the steps, that is, the step compensation covers 140 formed on the right and left edge portions of the ceramic body 11 may be asymmetrical with regard to each other.

The step compensation cover 140 may be formed of a glue type material, and include ceramic powder as a ceramic material, a solvent, a polymer, or the like.

Here, the ceramic material included in the step compensation cover 140 may have a viscosity higher than that of a ceramic material forming the ceramic body 110.

A viscosity of the step compensation cover 140 may preferably be 10,000 to 1,000,000 cps.

In the case in which the viscosity of the step compensation cover 140 is within the above-described range, fluidity thereof is provided, such that a filling rate at which a step is filled in the margin portion is increased at the time of application thereof.

Meanwhile, in the case in which the viscosity of the step compensation cover 140 is less than 10,000 cps, due to a gradation in the content of an organic material, the margin portion may have a non-filling area at the time of application thereof. In the case in which the viscosity of the step compensation cover 140 is more than 1,000,000 cps, due to degradation of the fluidity thereof, the step generated in the margin portion may not be filled at the time of filling the step of the margin portion. The viscosity of the ceramic material may be changed by controlling a level of dilution of the solvent included together with the ceramic material.

The ceramic body 110 may be formed by stacking the plurality of dielectric layers.

Here, the plurality of dielectric layers configuring the ceramic body 110 are in a sintered state and may be integrated such that a boundary between dielectric layers adjacent to each other may not be readily discernible.

In addition, the ceramic body 110 may generally have a rectangular parallelepiped shape, but is not limited thereto.

Further, the ceramic body 110 is not limited in dimensions, and for example, may have a size of 0.6 mm×0.3 mm, or the like, to thereby form the multilayered ceramic capacitor 100 having a high capacity of 1.0 µF or more.

The dielectric layer configuring the ceramic body 110 may include a ceramic powder, for example, a $BaTiO_3$-based ceramic powder, or the like.

An example of the $BaTiO_3$-based ceramic powder may have $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, or the like, having Ca, Zr, or the like, partially employed in $BaTiO_3$, but is not limited thereto.

The ceramic powder may have an average particle diameter of 0.8 µm or less, more preferably, 0.05 to 0.5 µm, but the present invention is not limited thereto.

If needed, together with the ceramic powder, the dielectric layer may further include at least one material selected from a transitional metal oxide or a carbide, rare-earth elements, and Mg or Al.

In addition, a thickness of the dielectric layer may be arbitrarily changed according to a capacity design of the multilayered ceramic capacitor.

The thickness of the dielectric layer in the embodiment of the present invention may be 1.0 µm or less, preferably 0.01 to 1.0 µm, respectively, but the present invention is not limited thereto.

The first and second internal electrodes 121 and 122 may be formed of a conductive paste including a conductive metal. Here, the conductive metal may be Ni, Cu, Pd or an alloy thereof, but the present invention is not limited thereto.

The first and second internal electrodes 121 and 122 may be formed by being printed on ceramic green sheets forming the dielectric layers, using the conductive paste through a printing method such as a screen printing method or a gravure printing method. The ceramic green sheets having the internal electrodes printed thereon may be alternately staked and fired to thereby form the ceramic body 110.

Here, capacitance is formed due to an area in which the first and second internal electrodes 121 and 122 are overlapped to each other.

In addition, each thickness of the first and second internal electrodes 121 and 122 may be determined according to the use thereof. For example, when considering the size of the ceramic body 110, the thickness of the first and second internal electrodes 121 and 122 may be determined to be within a range of 0.2 to 1.0 µm, but the present invention is not limited thereto.

Hereinafter, an operation of the multilayered ceramic capacitor 100 of the embodiment of the present invention configured as described above will be described below.

The dielectric layers may have a predetermined margin portion at a portion thereof at which the first and second internal electrodes 121 and 122 are not formed.

After forming the ceramic body 110 by stacking respective dielectric layers, the margin portion may serve to prevent a foreign material from being permeated into the first and second internal electrodes 121 and 122, and protect the first and second internal electrodes 121 and 122 from external impacts to thereby prevent an electrical short-circuit.

Here, in the case in which printed sheets are stacked and compressed, delamination or cracks may be generated at the edge portion of the ceramic body 110 due to the step between the first and second internal electrodes 121 and 122 and the margin portion, such that moisture, ions, a conductive foreign material, or the like, is permeated into the exposed surfaces of the first and second internal electrodes 121 and 122 through the delamination or cracks, whereby insulation resistance deterioration and reliability degradation, or the like, may be generated.

Here, the first and second internal electrodes 121 and 122 are formed on all dielectric layers, such that a width of the margin may be large, so that the above defect may be solved.

However, an influence of the step in the edge portion of the ceramic body 110 may be increased, and a material movement to the step during a compression process may be insufficient, such that the density of the margin portion may be degraded to generate cracks.

In addition, the internal electrodes are extended in order to fill the step, such that disconnection of the internal electrodes may be intensified to degrade the reliability thereof. The step is represented by lamination number×thickness of internal electrodes, and may be further greater in a super capacitor product having a large lamination number.

When a thickness of the ceramic body 110 is t1, a thickness between right and left lateral surfaces thereof is t2, and an interval between the first internal electrode 121 disposed on the uppermost portion among the first internal electrodes and the first internal electrode 121 disposed on the lowermost portion is ta in a design of the ceramic body 110, a recession ratio of the margin portion in which delamination or crack may be generated may be represented by the following Equation 1:

$$0 \le (t1-t2)/(t1-ta) \le 0.15 \qquad \text{[Equation 1]}$$

That is, in the case in which a value of (t1−t2)/(t1−ta) is 0, there is no recess in the margin portion, such that the step is not generated therein, and in the case in which a value of (t1−t2)/(t1−ta) is 0.15, the recession ratio of the margin portion is 15% as compared to the upper surface of the ceramic body 110.

Therefore, in the case in which the recession ratio of the margin portion is 15% or less, the step compensation cover 140 is used to compensate for the recessed margin portion, whereby delamination or cracks of the ceramic body 110 may be further effectively suppressed.

Figure 6:
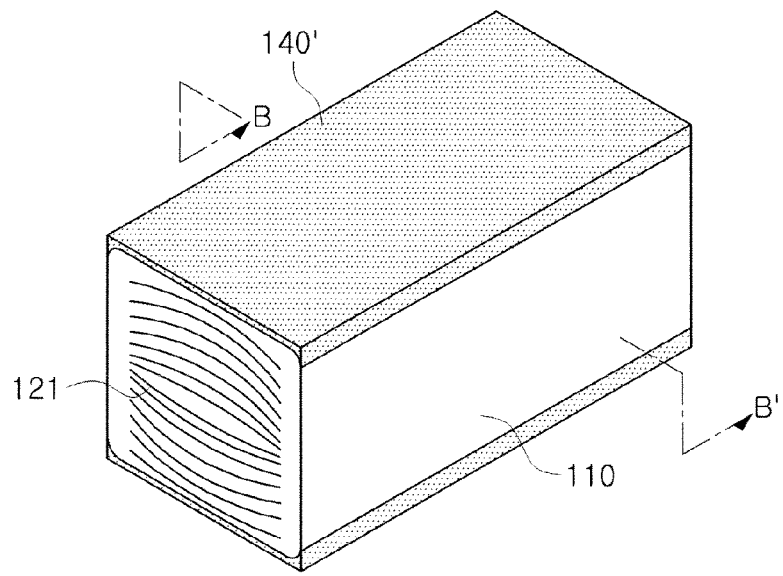
FIG. 6 is a perspective view illustrating a ceramic body, a first internal electrode, and a step compensation cover of a multilayered ceramic capacitor of another embodiment of the present invention.
Figure 7:
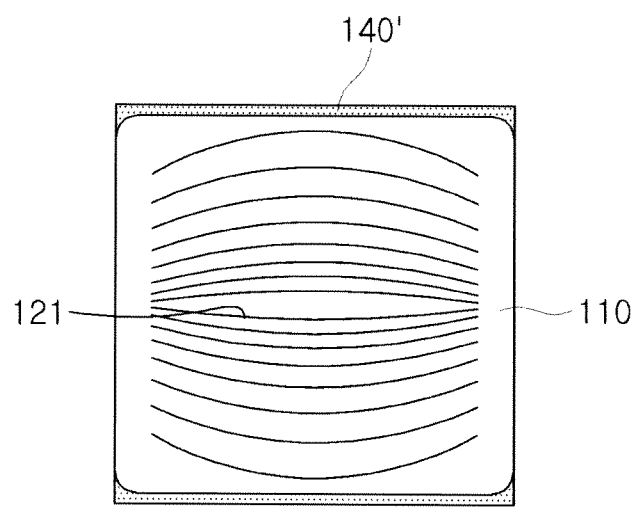
FIG. 7 is a cross-sectional view taken along line B-B' of FIG. 6.

FIGS. 6 and 7 show a multilayer ceramic capacitor according to another embodiment of the present invention.

Here, since structures of the ceramic body 110, the first and second internal electrodes 121 and 122, and the first and second external electrodes 131 and 132 are the same as those of the previous described embodiment of the present invention, a specific description thereof will be omitted in order to avoid the overlapping portions, and a step compensation cover 140' according to another embodiment will be described in detail.

Referring to FIGS. 6 and 7, the step compensation cover 140' may be formed so as to completely cover at least one of the upper surface and the lower surface of the ceramic body 110, as well as the edge portion of the ceramic body 110, in which the step is generated.

The embodiment of the present invention illustrates that the step compensation cover 140' completely covers the upper surface and the lower surface of the ceramic body 110. However, in some cases, the step compensation cover 140' may be formed so as to selectively cover only one of the upper surface and the lower surface of the ceramic body 110.

The step compensation cover 140' may suppress a delamination or crack generation due to the step of the internal electrodes 121 and 122 and the margin portion at both sides of the ceramic body 110, and serve as a cover layer covering an outermost surface of the ceramic body 110, to thereby prevent moisture, ions, the conductive foreign materials, or the like, from being permeated into the first and second internal electrodes, such that the degradation of reliability may be prevented.

Here, in the case in which a thickness of the step compensation cover 140' is relatively large, since a size of a chip is excessively large, the thickness thereof may be appropriately controlled so as to have a low thickness by as much as possible.

Hereinafter, a manufacturing method of a multilayered ceramic capacitor 100 according to an embodiment of the present invention will be described.

A plurality of ceramic green sheets are prepared.

In order to form the dielectric layers of the ceramic body 110, ceramic green sheets may be produced by mixing ceramic powder, a polymer, a solvent, and the like, to prepare a first ceramic slurry and the first ceramic slurry may be formed as sheets of several μm in thickness, using a doctor blade method.

Then, the conductive paste is printed on at least one of each of the ceramic green sheets so as to have a predetermined thickness, for example, 0.2 to 1.0 μm, to thereby form the first internal electrode 121 and the second internal electrode 122, respectively.

The first and second internal electrodes 121 and 122 may be formed by printing the conductive paste so as to form a margin portion along edge portions of the ceramic green sheets.

Here, the first internal electrode 121 may be formed on the first ceramic green sheet so as to be exposed through one end surface of the first ceramic green sheet, and the second internal electrode 122 may be formed on the second ceramic green sheet in a direction opposite to that of the first internal electrode 121 so as to be exposed through the other end surface of the second ceramic green sheet.

The conductive paste may be printed by using a screen printing method, a gravure printing method, or the like, and may include metal powder, ceramic powder, silica ($SiO_2$) powder, or the like.

The average particle diameter of the conductive paste may be 50 to 400 nm, but the present invention is not limited thereto.

The metal powder may be at least one of nickel (Ni), manganese (Mn), chromium (Cr), cobalt (Co), and aluminum (Al) or an alloy thereof.

Then, the first ceramic green sheet and the second ceramic green sheet are alternately stacked in plural, and pressurized in a stacking direction. The plurality of first and second ceramic green sheets and the first internal electrode 121 and the second internal electrode 122 formed on the plurality of first and second ceramic green sheets are compressed in a vertical direction to form a laminate.

Then, the step compensation cover 140 is formed on a portion of the upper surface and the lower surface of the laminate, the portion corresponding to the margin portion in which the first and second internal electrodes 121 and 122 are not formed to generate a step at the time of the stacking the plurality of first and second ceramic green sheets.

The step compensation cover 140 may be formed using a second ceramic slurry prepared by mixing ceramic powder, a polymer, a solvent, or the like.

The step compensation cover 140 may be formed by applying the second ceramic slurry to a corresponding portion of the laminate.

Here, the ceramic powder included in the second ceramic slurry forming the step compensation cover 140 may have a viscosity higher than that of the ceramic powder included in the first ceramic slurry forming the ceramic green sheets.

The ceramic material included in the step compensation cover 140 may have a viscosity of 10,000 to 300,000 cps. In the case in which the viscosity is 10,000 to 300,000 cps, the step compensation cover 140 may be formed by applying the second ceramic slurry to the laminate, and in the case in which the viscosity is 300,001 to 1,000,000 cps, the step compensation cover 140 may be formed by preparing a ceramic cover sheet using the second ceramic slurry, and then high-temperature and high-pressure pressing the ceramic cover sheet in the laminate.

Meanwhile, if needed, the step compensation cover 140 may be formed as a cover layer so as to completely cover at least one of the upper surface and the lower surface of the laminate.

Then, the laminate is cut into respective multilayered ceramic capacitors, and the respective multilayered ceramic capacitors are provided as chips and fired at a high temperature, to thereby complete the ceramic body 110 in which the step compensation cover 140 is formed on each edge portion having the step generated in the margin portion.

Next, the first and second external electrodes 131 and 132 may be formed on both end surfaces of the ceramic body 110 by covering the exposed portions of the first and second internal electrodes 121 and 122, so as to be electrically connected to each other.

Here, if needed, the first and second external electrodes 131 and 132 may be performed by a plating treatment using nickel, tin, or the like, on surfaces thereof.

As set forth above, according to the embodiment of the present invention, the step compensation cover is formed on the edge portion in a length direction of the ceramic body to compensate for the step of the ceramic body, such that the generation of delamination or cracks can be suppressed to significantly reduce the penetration of moisture, ions, a conductive foreign material, or the like, into the exposed surfaces of internal electrodes, through the portion in which the step of the ceramic body is generated, whereby the deterioration of insulation resistance in the multilayered ceramic electronic component can be prevented, and the reliability thereof can be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayered ceramic electronic component comprising:
   a ceramic body in which a plurality of dielectric layers are stacked;
   a plurality of first and second internal electrodes formed on at least one of the dielectric layers and alternately exposed through both ends of the ceramic body in a stacking direction of the ceramic body; and a step compensation cover including a ceramic material having a viscosity higher than that of a ceramic material included in the ceramic body and formed on at least one of an upper surface and a lower surface of the ceramic body.

2. The multilayered ceramic electronic component of claim 1, wherein the ceramic material included in the step compensation cover has a viscosity of 10,000 to 1,000,000 cps.

3. The multilayered ceramic electronic component of claim 1, wherein the step compensation cover is formed on a margin portion which is recessed in the ceramic body.

4. The multilayered ceramic electronic component of claim 1, wherein the step compensation cover completely covers at least one of the upper surface and the lower surface of the ceramic body.

5. The multilayered ceramic electronic component of claim 1, further comprising first and second external electrodes formed on both ends of the ceramic body and electrically connected to exposed portions of the first and second internal electrodes.

6. A manufacturing method of a multilayered ceramic electronic component, the method comprising:
   preparing a plurality of ceramic green sheets using a first ceramic slurry;
   forming first and second internal electrode patterns on at least one surface of each of the plurality of ceramic green sheets so as to be alternately exposed through both end surfaces thereof;
   forming a laminate by stacking the plurality of ceramic green sheets having the first and second internal electrode patterns formed thereon;
   forming a step compensation cover on at least one of an upper surface and a lower surface of the laminate, using a second ceramic slurry having a viscosity higher than that of a first ceramic slurry;
   cutting the laminate having the step compensation cover formed thereon into individual chips; and
   forming a ceramic body by firing the cut individual chips.

7. The manufacturing method of claim 6, wherein in the forming of the step compensation cover, the second ceramic slurry has a viscosity of 10,000 to 1,000,000 cps.

8. The manufacturing method of claim 7, wherein in the forming of the step compensation cover, the step compensation cover is formed by applying the second ceramic slurry having a viscosity of 10,000 to 300,000 cps to at least one of the upper surface and the lower surface of the laminate.

9. The manufacturing method of claim 7, wherein in the forming of the step compensation cover, the step compensation cover is formed by preparing a ceramic cover sheet using the second ceramic slurry having a viscosity of 300,001 to 1,000,000 cps, and high-temperature and high-pressure pressing the ceramic cover sheet on at least one of the upper surface and the lower surface of the laminate.

10. The manufacturing method of claim 6, wherein in the forming of the step compensation cover, the step compensation cover is formed on a margin portion which is recessed in the ceramic body.

11. The manufacturing method of claim 6, wherein in the forming of the step compensation cover, the step compensation cover completely covers at least one of the upper surface and the lower surface of the ceramic body.

12. The manufacturing method of claim 6, further comprising forming first and second external electrodes on the both end surfaces of the ceramic body so as to cover exposed surfaces of the first and second internal electrode patterns.

* * * * *